(12) United States Patent
Ji et al.

(10) Patent No.: US 11,645,076 B2
(45) Date of Patent: May 9, 2023

(54) REGISTER PRESSURE TARGET FUNCTION SPLITTING

(71) Applicant: International Business Machines Corporation, Armonk, NY (US)

(72) Inventors: Jinsong Ji, Ponte Vedra, FL (US); Zheng Chen, Songjiang (CN); Ke Wen Lin, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 48 days.

(21) Appl. No.: 17/384,887

(22) Filed: Jul. 26, 2021

(65) Prior Publication Data

US 2023/0029183 A1    Jan. 26, 2023

(51) Int. Cl.
*G06F 9/30* (2018.01)
*G06F 8/41* (2018.01)

(52) U.S. Cl.
CPC ............ *G06F 9/30134* (2013.01); *G06F 8/41* (2013.01); *G06F 8/433* (2013.01); *G06F 8/443* (2013.01); *G06F 9/3013* (2013.01)

(58) Field of Classification Search
CPC ...... G06F 9/3013; G06F 9/30134; G06F 8/41; G06F 8/433; G06F 8/443
See application file for complete search history.

(56) References Cited

U.S. PATENT DOCUMENTS

| | | | | |
|---|---|---|---|---|
| 5,946,491 | A | * 8/1999 | Aizikowitz | G06F 8/441 717/158 |
| 8,893,104 | B2 | 11/2014 | Vick et al. | |
| 9,411,565 | B1 | * 8/2016 | Perron | G06F 9/30098 |
| 9,436,447 | B2 | * 9/2016 | Kong | G06F 8/456 |

OTHER PUBLICATIONS

Braun, M. & Hack, S., "Register Spilling and Live-Range Splitting for SSA-Form Programs," Mar. 2009, Proceedings of the 18th International Conference on Compiler Construction, pp. 174-189.
Liu, X. et al., "Research of Register Pressure Aware Loop Unrolling Optimizations for Compiler," Nov. 14, 2018, MATEC Web of Conferences, vol. 228, No. 03008, 5 pages.
Makarov, V. N., "Fighting register pressure in GCC," 2004, GCC Developers' Summit, pp. 86-104.
Wimmer, C. & Mossenbock, H., "Optimized Interval Splitting in a Linear Scan Register Allocator?," Jun. 2005, Proceedings of the 1st ACM/USENIX international conference on Virtual execution environments, pp. 132-141.

* cited by examiner

*Primary Examiner* — Corey S Faherty
(74) *Attorney, Agent, or Firm* — Cantor Colburn LLP; Teddi Maranzano

(57) ABSTRACT

Provided are embodiments for a method of performing register pressure targeted function splitting. The method can include determining a candidate region of a function, the candidate region comprising variables, and determining a number of available registers in a computing system for allocating the variables of the function. The method can also include grouping the variables in the candidate region into first variables and second variables based at least in part on the number of available registers, and splitting the candidate region of the function into split functions based at least in part on the grouping of the variables. Also provided are embodiments for a computer program product and a system for performing register pressure targeted function splitting.

17 Claims, 5 Drawing Sheets

```
void foo(double *src, int count) {
    for (int i = 0; i < count; i++) { var1 = foo1(src[i]);
        var2 = foo2(src[i]);
        // var3 - var147 are assigned with foo#(src[i])
        var148 = foo148(src[i]);
        var149 = foo149(src[i]);
        var150 = foo150(src[i]);
        double tmpvar1 = 2.31*var1 + 2.51*var2 + 3.31*var3 + 3.71*var4 + 5.11*var5 + 5.31*var6;
        double tmpvar2 = 2.32*var7 + 2.52*var8 + 3.32*var9 + 3.72*var10 + 5.12*var11 + 5.32*var12;
        // tmpvar3 - tmpvar2 are all calculated by 6 independent var#
        double tmpvar23 = 2.323*var133 + 2.523*var134 + 3.223*var135 + 3.723*var136 + 5.123*var137 + 5.323*var138;
        double tmpvar24 = 2.324*var139 + 2.524*var140 + 3.224*var141 + 3.724*var142 + 5.124*var143 + 5.324*var144;
        double tmpvar25 = 2.325*var145 + 2.525*var146 + 3.225*var147 + 3.725*var148 + 5.125*var149 + 5.325*var150;

dest1[i] = tmpvar1;
        dest2[i] = tmpvar2;
        // dest3[i] - dest23[i] are assigned with tmpvar#
        dest23[i] = tmpvar23;
        dest24[i] = tmpvar24;
        dest25[i] = tmpvar25;
    }
}
```

202, 204, 206

Liveins(150): {var1, var2, ..., var148, var149, var150}
Liveouts(25): {dest1, dest2, ..., dest23, dest24, dest25}
Groups(25): {(dest1, var1, ..., var6), ..., (dest25, var145, ..., var150)}

FIG. 2

```
void foo(double *src, int count) {
    foo_outline1(src, count);
    foo_outline2(src, count);
    foo_outline3(src, count);
    foo_outline4(src, count);
    foo_outline5(src, count);
} void foo_outline1(double *src, int count) {
    for (int i = 0; i < count; i++) {
        var1 = foo1(src[i]);
        var2 = foo2(src[i]);
        // var3 ~ var27 are assigned with foo#(src[i])
        var28 = foo28(src[i]);
        var29 = foo29(src[i]);
        var30 = foo30(src[i]);
        double tmpvar1 = 2.31*var1 + 2.32*var2 + 3.31*var3 + 3.71*var4 + 5.11*var5 + 5.31*var6;
        double tmpvar2 = 2.32*var7 + 2.52*var8 + 3.32*var9 + 3.72*var10 + 5.12*var11 + 5.32*var12;
        double tmpvar3 = 2.33*var13 + 2.53*var14 + 3.33*var15 + 3.73*var16 + 5.13*var17 + 5.33*var18;
        double tmpvar4 = 2.34*var19 + 2.54*var20 + 3.34*var21 + 3.74*var22 + 5.14*var23 + 5.34*var24;
        double tmpvar5 = 2.35*var25 + 2.55*var26 + 3.35*var27 + 3.75*var28 + 5.15*var29 + 5.35*var30;
        dest1[i] = tmpvar1;
        dest2[i] = tmpvar2;
        dest3[i] = tmpvar3;
        dest4[i] = tmpvar4;
        dest5[i] = tmpvar5;
    }
}
```

REGISTER PRESSURE TARGET FUNCTION SPLITTING

BACKGROUND

The present invention generally relates to register allocation, and more specifically, to register pressure target function splitting.

A computer system's processor is the intelligent portion of the computer system. The processor is responsible for executing programs that interpret and manipulate information that is given to the computer system by the computer system's user or users.

In today's environment, a processor operates on data contained within its registers with greater speed than operations on data stored external to the processor (e.g., in main memory). Designers of processors choose the number of processor registers which will allow the processor to perform well. The number of processor registers in a typical computer system is relatively small compared to the number of program variables in a typical computer program that the processor executes. Thus, the many program variables in a computer program must be allocated to specific processor registers for the processor to appropriately operate on the data.

Each of the program variables that are operated upon in a computer program must be assigned a corresponding processor register. Allocating the fixed number of processor registers to a much larger number of program variables in a computer program is generally referred to as register allocation. The performance of the computer system depends on how efficiently the processor uses its registers, which depends on the efficiency of the register allocation scheme. Therefore, register allocation can directly impact the performance of the computer system. A compiler is often used to allocate program variables in a computer program to processor registers. Register allocation in a typical compiler uses the concept of "live ranges" or "lifetimes" of program variables. The "live range" or "lifetime" of a particular program variable is the span of instructions for which the variable contains valid data, and it may be computed in a number of different ways.

Since the processor can only operate on data stored in registers, spilling a live range implies that the value must be loaded from memory into a register when it is needed, and stored back to memory when changed. Spilling a live range requires the insertion of instructions into the instruction stream to perform the necessary stores to memory and loads from memory. These instructions are known as "spill code." The generation of spill code requires compiler time, and the presence of spill code in the instruction stream reduces the performance of the computer program.

SUMMARY

Embodiments of the present invention are directed to register pressure targeted function splitting. A non-limiting example computer-implemented method includes determining a candidate region of a function, the candidate region comprising variables, and determining a number of available registers in a computing system for allocating the variables of the function. The computer-implemented method can also include grouping the variables in the candidate region into first variables and second variables based at least in part on the number of available registers, and splitting the candidate region of the function into split functions based at least in part on the grouping of the variables. Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 2 illustrates sample code to be split in accordance with one or more embodiments of the invention;

FIG. 3 illustrates sample code in accordance with one or more embodiments of the invention;

Figure 1:
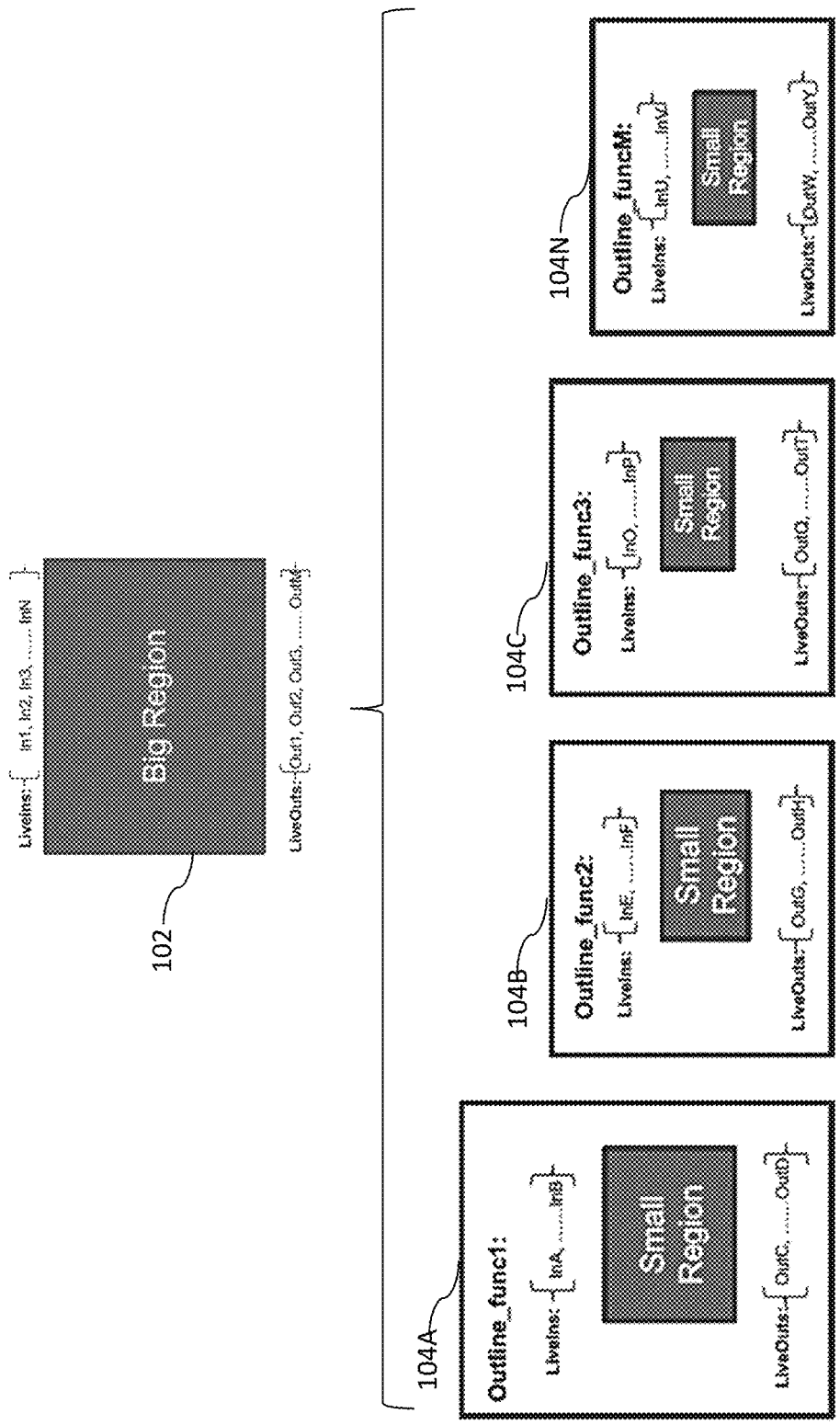
FIG. 1 illustrates a block diagram of sample function that is split into multiple functions in accordance with one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Register pressure measures the availability of free registers at any point in time during the execution of a program or function. The register pressure can be considered high when a large number of the available registers are in use. The higher the register pressure, the more often the contents of the register must be spilled into system memory. A spill is when a variable is moved and/or stored in system memory as opposed to being stored in the register. If the variables are still live variables, they may be subsequently accessed and reloaded back into the registers for further processing. Spills may be unavoidable in compiler register allocation due to hardware register limitations, such as the number of available registers. Increasing the number of registers in an architecture decreases register pressure but increases the cost.

One or more techniques discussed herein intelligently reduce the spilling of live variables into the system memory to improve the performance of a compiled program. As discussed, if the number of variables exceed the number of registers of the processing system during processing a spill may occur. The techniques described herein perform a liveliness analysis to determine which variables are live. A variable is live if it holds a value that is needed in the future or may be read before the variable is written to again. The variables can include live input variables (LiveIns) and live output variables (LiveOuts) for each region.

One or more embodiments of the present invention provide techniques for splitting larger functions into smaller functions based on the detected register pressure. Splitting the larger functions allows the processor to reduce and/or avoid spilling the data into the system memory and re-load the data back into the registers for processing.

In an application's assembly code, spills that are inserted by the compiler register allocator may hinder the performance of the application. Performance can be detrimentally impacted particularly when the spills/reloads are inside a hot loop. Register allocation decides which parts of a variable's live range are held in registers and which are held in system memory. The compiler inserts spill code to move the values of variables between registers and memory. Since fetching data from memory is much slower than reading the data directly from a register, attention must be given to avoid spilling or careful spill code insertion to maintain the performance of the compiled program. The spilling and reloading process may lead to processing inefficiencies when executing the programs.

Also, techniques using artificial intelligence or machine learning require the computation of an enormous amount of data and are very computation intensive. It is common for computation intensive applications to keep large number of variables and computation at the same time, which presents challenges to modern compilers.

One or more embodiments of the invention provide techniques to introduce a method, system, and computer program product to reduce high register pressure function by splitting functions into multiple small functions having less pressure. One or more embodiments of the present invention provide technological improvements over current methods of register allocation that requires numerous spills into the system memory and reloads in the register. Disadvantages of contemporary approaches may include the mismanagement or non-optimal spilling of variables into the system memory which can detrimentally impact the performance of the function/application. One or more embodiments of the present invention provide technical solutions to one or more of these disadvantages of existing solutions by splitting the high register pressure function into multiple small functions to reduce the register pressure. Each of the smaller functions are split so the live variables of each of the small functions do not spill into system memory and hinder the processing time of the function.

Turning now to FIG. 1, a portion of code 102 representing a function in accordance with one or more embodiments of the invention is shown. During processing, by a processing system such as the processing system 500 that is discussed with reference to FIG. 5, the code 102 is compiled. The code 102 can include a large number of variables. During processing, an allocator (not shown) can allocate and assign the values for the variables between the registers of the central processing unit (CPU) 521 and the memory 524 in the processing system 500 shown in FIG. 5.

Also shown in FIG. 1 are split functions 104A, 104B, 104C ... 104N representing portions of the code 102 that have been split from the code 102. In accordance with one or more embodiments of the present invention, the code 102 is split according to method 400 described with reference to FIG. 4 below. Each of the split functions 104 includes live variables (LiveIns and LiveOuts for the region) that are grouped to reduce and/or eliminate the need to spill the variables into the memory 524 of the processing system 500. For example, the split function 104A for Outline_func1 includes LiveIns: {InA, ... InB} and LiveOuts: {OutC, ... OutD}. Similarly, the other split functions 104 include LiveIns and LiveOuts that have been grouped according to the embodiments described herein to reduce and/or eliminate the spilling of the variables to the system memory further delaying processing. Although, only four split functions are shown in FIG. 1, it can be appreciated that any number of split functions 104 can be used to split the code 102 in accordance with one or more embodiments of the invention. It can be appreciated that the union set of LiveIns and LiveOuts of all split functions are equal to the LiveIns and LiveOuts of code 102.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Referring now to FIG. 2, a non-limiting example of code 200 for allocating variables is shown. In the example, the code 200 includes live variables (150 LiveIns and 25 LiveOuts). In embodiments of the invention, the live variables can be determined by performing a live variable analysis of the code 200.

Figure 5:
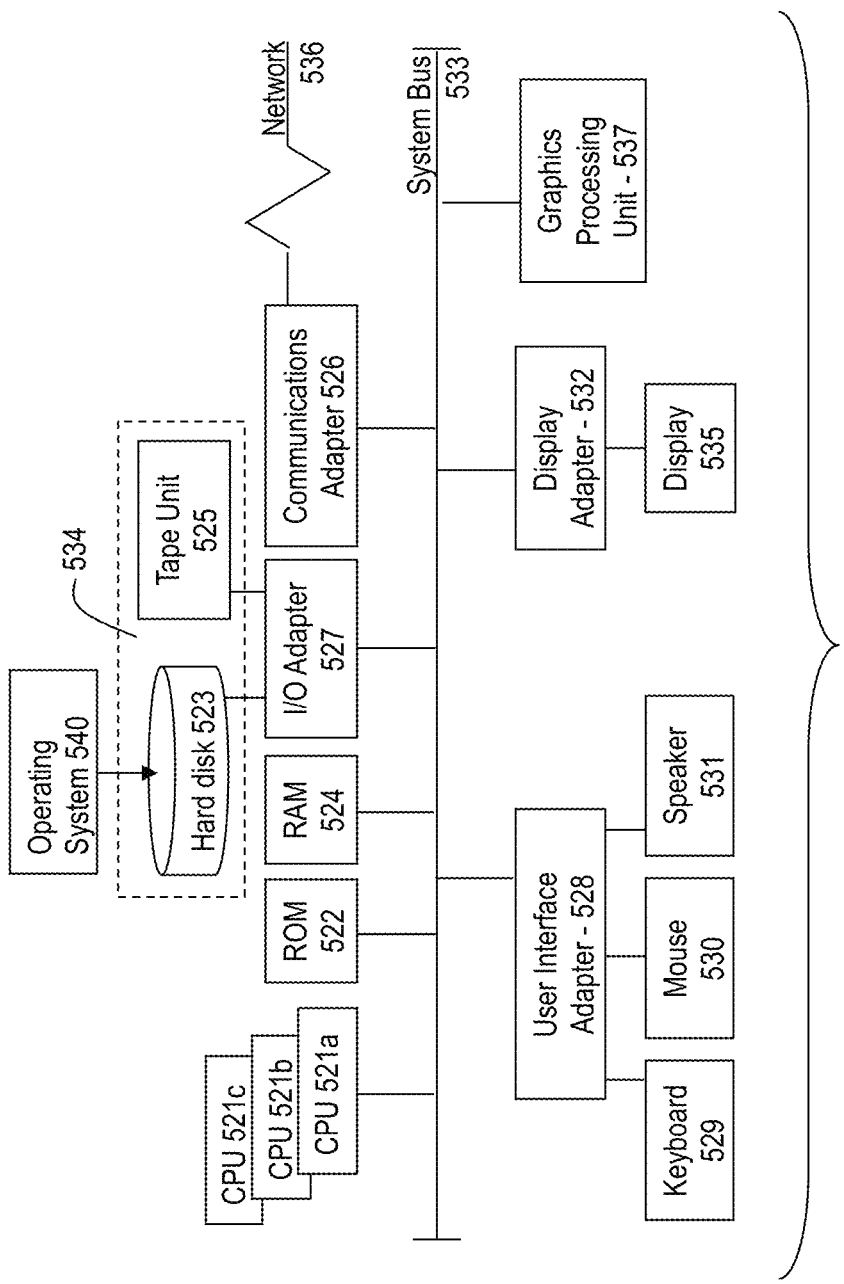
FIG. 5 depicts a computing system for practicing the teachings discussed herein in accordance with one or more embodiments of the invention.

In a non-limiting example, a processing system, such as processing system 500 of FIG. 5, can include 32 general purpose registers (GPRs) for variable allocation during processing. Although 32 registers are used with reference to the example, it is not intended to limit the scope of the disclosure to 32 registers but instead, a processing system can include any number of registers.

Therefore, because 150 LiveIns are included in the example code 200 of FIG. 2 and only 32 registers are available for allocation, in order to split the code 102 into the same size split functions at least 5 split functions having 30 variables assigned are used. Also, because 25 LiveOuts are used, each of the split functions 104 can have 5 LiveOuts (dest1 [i]). Therefore, each split function should have less than 32 LiveIns to avoid spilling the variables into the system memory. Given that each destination array is not aliased to each other, all destinations can be split into any split functions.

In FIG. 2, section 202 of the code 102 assigns the values to the variables (var1-var150) representing the LiveIns. Since the number of live variables exceeds the number of available registers a spill must occur during the processing of the code. Subsequently, when the variables are needed, they must be accessed from the system memory. Section 204 of the code 102 assigns the grouped variables representing the LiveIns to the temporary variables (tmpvar1-tempvar25). The temporary variables have been calculated for groups of six variables (varN). Section 206 of the code 102 assigns the tmpvarN to the destination (dest1-dest25) representing the LiveOuts.

FIG. 3 depicts a non-limiting example of code 300 for performing register pressure target function splitting in accordance with one or more embodiments of the present invention. As shown in section 302, the code 200 has been split into 5 split functions ("foo_outline1"-"foo_outline5") to eliminate the spilling of the variables into the system memory. The number of variables in the code 200 is determined for grouping the LiveOut variables to the LiveIn variables. Each LiveOut variable can be calculated by a plurality of LiveIn variables. This can be accomplished by performing a compiler data flow analysis of the code.

Section 304 of the code 300 allocates variables (var1-var30) during the first iteration. In section 306, 6 variables are grouped and assigned to the tmpvarN. For each iteration of the code 300, each split function contains 5 LiveOuts and includes 30 LiveIns (5 LiveOuts*6 LiveIns).

It should be understood that the group size for each group can be based on the number of system registers and the correspondence of the application LiveIn variables and LiveOut variables. In some embodiments, the group size may be the same size. In other embodiments, the group size may be different. For example, suppose a system having 4 registers with a region including groups {{liveout1, livein1, livein2}, {liveout2, livein3, livein4}, {liveout3, livein5, livein6, livein1}}. The region can be split into two functions: wherein a first split function 1 has {{liveout1, livein1, livein2}, {liveout2, livein3, livein4}; where a second split function 2 has {{liveout3, livein5, livein6, livein1}}. As shown in this example, instead of spilling the variables into memory, the system registers are sufficient for managing the variables of each split function.

During each iteration only 30 registers are required. Each LiveOut represent 6 LiveIns, which reduces the number of spills into the system memory. Finally, in section 308, the tmpvarN are assigned to a destination (destN[i]).

After the first iteration of the code 300 is completed, the next split function ("foo_outline2") is executed which also limits the spilling of the live variables into the system memory. The subsequent code 300 is executed, until each split function has been processed. Although, only 5 split functions are shown in FIG. 5, any number of split functions can be used and is not limited by the example discussed herein.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 4:
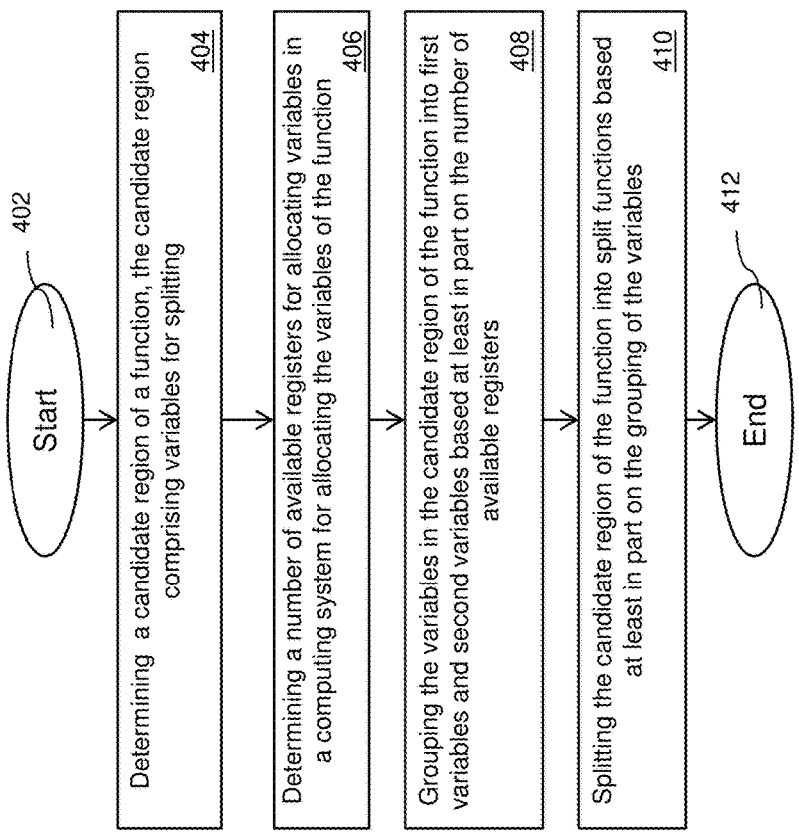
FIG. 4 illustrates a flow diagram of a method for register pressure target function splitting in accordance with one or more embodiments of the present invention.

FIG. 4 depicts a flowchart of a method 400 for performing register pressure target function splitting in accordance with one or more embodiments of the invention. The method 400 can be performed in a system such as that discussed with reference to FIG. 5 discussed below. The method 400 begins at block 402 and proceeds to block 404 which provides for determining a candidate region of a function, the candidate region including variables for splitting. In one or more embodiments of the invention, a compiler data flow analysis can be performed to determine the correspondence between the LiveIn variables and the LiveOut variables. Each Liveout can be calculated by several LiveIn variables. Block 406 determines a number of available registers for allocating variables in a computing system for allocating the variables of the function. Block 408 groups the variables in the candidate region of the function into first variables and second variables based at least in part on the number of available registers. To ensure that no spilling occurs, when grouping the variables, a single LiveOut can be used in each split function. Also, each split function can include as many LiveIn variables as possible as long as the total number of LiveIn variables is few than the number of system registers. The dependency which may be determined by an alias and/or definition-use chains or use-definition (UD) chains, is ensured by the order of the split functions or by placing the dependent LiveOut variables in the same split function. A UD chain is a data structure that include a use U of a variable, and all the definitions D of that variable that can reach that use U without any other intervening definitions. A UD chain generally means the assignment of some value to a variable. The grouping and group size as discussed above depend on the number of system registers and the correspondence of the LiveIn variables and LiveOut variables. This can lead to different number of group sizes for each split function. Block 410 splits the candidate region of the function into split functions based at least in part on the grouping of the variables. In one or more embodiments of the invention, executing the function includes compiling the source code according to the split function and allocating the LiveIns and LiveOuts to the registers of the computing system based on the split functions. The method 400 ends at block 412.

In one or more embodiments of the invention, the splitting of the code 200 may factor one or more constraints and/or heuristic strategies for grouping the LiveIns and LiveOuts. The constraints and heuristic strategies can avoid spills in the processing system 500. Additionally, they can be used to improve the performance in scenarios there are no spills. For example, such constraints for performing the splitting can include but are not limited to: 1) requiring a low register requirement for each splitting function (each virtual register in an instruction register (IR) for a splitting function can be assigned with a physical register. In other words, spill should not be generated); and 2) dependency (like alias or def/use) of Liveouts must be ensured by the order of the splitting functions or by keeping dependent Liveouts in same splitting functions.

In one or more embodiments of the invention, the splitting of the code can be subject to various heuristic strategies such as but not limited to the consideration of 1) if function calls are expensive in some target, less functions may be outlined; 2) if some common computation is very expensive, for example loop count calculation in big region, less functions may be outlined; 3) if some LiveOuts access adjacent memory address, group them together to be in same split function for cache locality; 4) if most of LiveIns are the same for LiveOuts, they can be grouped together to be same outlined function; and 5) if the big region/function contains a loop and spill/reload occurs inside the loop, the splits should be targeted for reducing the loop LiveIns first. It should be understood that other heuristics strategies can be used and are not limited to those discussed herein.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

The technical effects and benefits improve over the prior art by reducing spills that may occur during processing which optimizes the spilling of variables into the system memory and decreases the delay in processing time to retrieve the data from the system memory for processing.

The techniques described herein enable register pressure target function splitting. Upon detection of the register pressure, the function can be split into multiple smaller functions. In the smaller split functions, the register allocators can allocate registers to the variables without spilling the data into the memory. The techniques described herein can include an analysis step to analyze the code/function and a transformation step to implement the code according to the split functions. The techniques described herein can work with any existing register allocation algorithm, and the techniques can also introduce additional compiler optimization opportunities due to the smaller size of the split functions.

Turning now to FIG. 5, a processing system 500 for determining data placement on storage devices is generally shown in accordance with one or more embodiments of the present invention. It is understood that one or more embodiments of the present invention are capable of being implemented in conjunction with any other type of computing environment now known or later developed. For example, FIG. 5 depicts a block diagram of a processing system 500 for implementing the techniques described herein. In the embodiment shown in FIG. 5, processing system 500 has one or more central processing units (processors) 521a, 521b, 521c, etc. (collectively or generically referred to as processor(s) 521 and/or as processing device(s)). According to one or more embodiments of the present invention, each processor 521 can include a reduced instruction set computer (RISC) microprocessor. Processors 521 are coupled to system memory (e.g., random access memory (RAM) 524) and various other components via a system bus 533. Read only memory (ROM) 252 is coupled to system bus 533 and can include a basic input/output system (BIOS), which controls certain basic functions of processing system 500.

Further illustrated are an input/output (I/O) adapter 527 and a communications adapter 526 coupled to system bus 533. I/O adapter 527 can be a small computer system interface (SCSI) adapter that communicates with a hard disk 523 and/or a tape storage device 525 or any other similar component. I/O adapter 527, hard disk 523, and tape storage device 525 are collectively referred to herein as mass storage 534. Operating system 540 for execution on processing system 500 can be stored in mass storage 534. The RAM 522, ROM 524, and mass storage 534 are examples of memory 519 of the processing system 500. A network adapter 526 interconnects system bus 533 with an outside network 536 enabling the processing system 500 to communicate with other such systems.

A display (e.g., a display monitor) 535 is connected to system bus 533 by display adaptor 532, which can include a graphics adapter to improve the performance of graphics intensive applications and a video controller. According to one or more embodiments of the present invention, adapters 526, 527, and/or 532 can be connected to one or more I/O busses that are connected to system bus 533 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 533 via user interface adapter 528 and display adaptor 532. A keyboard 529, mouse 530, and speaker 531 can be interconnected to system bus 533 via user interface adapter 528, which can include, for example, a Super I/O chip integrating multiple device adapters into a single integrated circuit.

According to one or more embodiments of the present invention, processing system 500 includes a graphics processing unit 537. Graphics processing unit 537 is a specialized electronic circuit designed to manipulate and alter memory to accelerate the creation of images in a frame buffer intended for output to a display. In general, graphics processing unit 537 is very efficient at manipulating computer graphics and image processing and has a highly parallel structure that makes it more effective than general-purpose CPUs for algorithms where processing of large blocks of data is done in parallel.

Thus, as configured herein, processing system 500 includes processing capability in the form of processors 521, storage capability including system memory (e.g., RAM 524), and mass storage 534, input means such as keyboard 529 and mouse 530, and output capability including speaker 531 and display 535. According to one or more embodiments of the present invention, a portion of system memory (e.g., RAM 524) and mass storage 534 collectively store an operating system such as the AIX® operating system from IBM Corporation to coordinate the functions of the various components shown in processing system 500.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for register pressure targeted function splitting, the method comprising:
   determining a candidate region of a function, the candidate region comprising variables;
   determining a number of available registers in a computing system for allocating the variables of the function;
   grouping the variables in the candidate region into first variables and second variables based at least in part on the number of available registers; and
   splitting the candidate region of the function into split functions based at least in part on the grouping of the variables,
   wherein the grouping is performed based at least in part on a use-definition chain for the variables of the function, wherein the use-definition chain is a data structure that includes a use of a variable and the definitions of the variable that can reach the use without any other intervening definitions.

2. The computer-implemented method of claim 1, further comprising performing a live variable analysis to determine the variables in the function prior to performing the grouping of the variables.

3. The computer-implemented method of claim 1, wherein each of the variables is characterized as one selected from the group consisting of a live input variable and a live output variable.

4. The computer-implemented method of claim 3, wherein the live input variables and the live output variables are grouped together in each of the split functions.

5. The computer-implemented method of claim 1, wherein each of the split functions comprises fewer variables than the number of available registers in the computing system.

6. The computer-implemented method of claim 1, further comprising performing the execution of the function using the split function.

7. A system for performing register pressure targeted function splitting, the system comprising:
   a memory having computer readable instructions;
   one or more processors for executing the computer readable instructions, the computer readable instructions controlling the one or more processors to perform operations comprising:
   determining a candidate region of a function, the candidate region comprising variables;
   determining a number of available registers in a computing system for allocating the variables of the function;
   grouping the variables in the candidate region into first variable and second variables based at least in part on the number of available registers; and
   splitting the candidate region of the function into split functions based at least in part on the grouping of the variables,
   wherein the grouping is performed based at least in part on a use-definition chain for the variables of the function, wherein the use-definition chain is a data structure that includes a use of a variable and the definitions of the variable that can reach the use without any other intervening definitions.

8. The system of claim 7, wherein the operations further comprise performing a live variable analysis to determine the live variables in the function prior to performing the grouping of the variables.

9. The system of claim 7, wherein each of the variables is characterized as one selected from the group consisting of a live input variable and a live output variable.

10. The system of claim 9, wherein the live input variables and the live output variables are grouped together in each of the split functions.

11. The system of claim 7, wherein each of the split functions comprises fewer variables than the number of available registers in the computing system.

12. The system of claim 7, wherein the operations further comprise performing the execution of the function using the split function.

13. A computer program product comprising a computer-readable storage medium having program instructions embodied therewith, the program instructions executable by one or more processors to cause the one or more processors to perform operations comprising:
- determining a candidate region of a function, the candidate region comprising variables;
- determining a number of available registers in a computing system for allocating the variables of the function;
- grouping the variables in the candidate region into first variables and second variables based at least in part on the number of available registers; and
- splitting the candidate region of the function into split functions based at least in part on the grouping of the variables,
- wherein the grouping is performed based at least in part on a use-definition chain for the variables of the function, wherein the use-definition chain is a data structure that includes a use of a variable and the definitions of the variable that can reach the use without any other intervening definitions.

14. The computer program product of claim 13, wherein the operations further comprise performing a live variable analysis to determine live variables in the function prior to performing the grouping of the variables.

15. The computer program product of claim 13, wherein each of the variables is characterized as one selected from the group consisting of a live input variable and a live output variable.

16. The computer program product of claim 15, wherein the live input variables and the live output variables are grouped together in each of the split functions.

17. The computer program product of claim 13, wherein each of the split functions comprises fewer variables than the number of available registers in the computing system.

* * * * *